United States Patent
Brockhaus

(10) Patent No.: US 7,171,336 B2
(45) Date of Patent: Jan. 30, 2007

(54) METHOD FOR OPERATING A MEASURING INSTRUMENT

(75) Inventor: Helmut Brockhaus, Dinslaken (DE)

(73) Assignee: Krohne A.G., Basel (CH)

( * ) Notice: Subject to any disclaimer, the term of this patent is extended or adjusted under 35 U.S.C. 154(b) by 68 days.

(21) Appl. No.: 10/998,431

(22) Filed: Nov. 29, 2004

(65) Prior Publication Data

US 2006/0116854 A1    Jun. 1, 2006

(30) Foreign Application Priority Data

Nov. 27, 2003  (DE)  ............... 103 56 008

(51) Int. Cl.
*G06F 11/30* (2006.01)
(52) U.S. Cl. ............ 702/183; 702/127; 702/189; 714/25; 714/27; 714/34; 700/83; 700/90; 700/174; 340/870.04; 340/870.16; 340/3.62
(58) Field of Classification Search ............... 702/183, 702/188–189; 714/25, 27, 34; 600/30; 700/83, 700/90, 174; 340/870.04, 870.16, 913, 3.62; 701/114
See application file for complete search history.

(56) References Cited

U.S. PATENT DOCUMENTS

| | | | |
|---|---|---|---|
| 5,278,493 A * | 1/1994 | Henkelmann | ............... 324/115 |
| 5,398,251 A | 3/1995 | Shim | |
| 5,861,882 A * | 1/1999 | Sprenger et al. | ............ 715/700 |
| 6,073,088 A * | 6/2000 | Pryce et al. | ................. 702/182 |
| 6,564,612 B2 | 5/2003 | Brockhaus | |
| 6,906,507 B2 * | 6/2005 | Briese et al. | ............... 324/142 |
| 2003/0063275 A1 * | 4/2003 | Hubble et al. | .............. 356/319 |

FOREIGN PATENT DOCUMENTS

DE    10118002 A1   10/2002

OTHER PUBLICATIONS

Drera et al. 'Practical Solution for the Shutdown Process in Industrial Facilities Depending on Network Disturbances', Jun. 2001, IEEE Publication, No. 482, pp. 1-5.*
Oyegoke et al., 'Partial Discharge Measurement as Diagnostic Tool for Power Cable Systems', 2001, ESPOO, Literature Review, pp. 1-36.*

* cited by examiner

*Primary Examiner*—Marc S. Hoff
*Assistant Examiner*—Elias Desta
(74) *Attorney, Agent, or Firm*—Cesari & McKenna, LLP; John F. McKenna

(57) ABSTRACT

A method for operating a measuring instrument is capable of performing multiple diagnostic functions. For this, a process control is provided for the execution of the diagnostic functions in a manner whereby the normal measuring operation of the measuring instrument is interrupted, a first diagnostic function is performed during that interruption, the normal measuring operation is resumed after completion of the first diagnostic function, the normal measuring operation is again interrupted, and during that later interruption of the normal measuring operation a second diagnostic function is performed. In this fashion, even numerous diagnostic functions can be easily and efficiently integrated into the operation of a measuring instrument such as a magnetoinductive flowmeter.

12 Claims, 2 Drawing Sheets

METHOD FOR OPERATING A MEASURING INSTRUMENT

This invention relates to a method for operating a measuring instrument, which measuring instrument is capable of performing multiple diagnostic functions.

BACKGROUND OF THE INVENTION

Measuring instruments capable of different diagnostic functions, for instance magnetoinductive measuring devices, have been known in prior art. These self-diagnostic functions are intended to monitor the operation of the measuring instrument concerned, thus improving its dependability. Among these diagnostic functions are those that do not affect the measuring operation, and others that would interfere with the normal measuring operation and can therefore be activated only while the measuring operation is turned off.

SUMMARY OF THE INVENTION

It is the objective of this invention to introduce a method for operating a measuring instrument whereby the diagnostic functions discussed can be carried out in is simple and effective fashion.

The above-mentioned method for operating a measuring instrument achieves this objective in that the process of the measuring operation is controlled in a manner as to allow for the interpolation of the diagnostic functions, whereby the normal measuring operation is interrupted, a first diagnostic function is carried out during that interruption of the normal measuring operation, the normal measuring operation is resumed after the first diagnostic function has been completed, the normal measuring operation is interrupted again and during that interruption of the normal measuring operation a second diagnostic function is carried out.

Thus, as the substance of this invention, the process of the operation of the measuring instrument is controlled to permit diagnostic functions to be performed, in that the normal measuring operation is interrupted and various discrete diagnostic functions are carried out sequentially during these interruptions. A suitably designed process control according to this invention will prevent different diagnostic functions from affecting or interfering with one another and from having any significant impact on the normal measuring operation.

Specifically, in one preferred embodiment of the invention, the normal measuring operation can be resumed after completion of the second diagnostic function, the normal measuring operation of the measuring instrument is then interrupted again, and during that interruption, the first or a third diagnostic function is performed. This means that the various diagnostic functions can be repeated after different time segments, thus in essence allowing any given number of diagnostic functions to be integrated into the process control according to this invention.

Repeat performance of diagnostic functions can be selected in essentially arbitrary fashion, and, specifically, no periodic sequence is required. On the other hand, if periodic repetition of the diagnostic functions is desired, it is possible to repeat all diagnostic functions at the same frequency. In a preferred implementation of the invention, however, the individual diagnostic functions are repeated periodically at different frequencies, which allows particularly important diagnostic functions to be repeated more often. To that effect, the repeat frequency of the diagnostic functions may be preset. Alternatively, the repeat frequency of the diagnostic functions may be selectable by the user of the measuring instrument.

In principle, the duration of the interruption of the normal measuring operation may be the same for all diagnostic functions. In a preferred variation of the invention, however, the duration of the interruption of the normal measuring operation is controlled according to the type of diagnostic function to be performed. Hence, the interruptions of the normal measuring operation do not have to be of equal length for all diagnostic functions; instead, in the case, for instance, of rapid diagnostic checks, only a very short interruption of the normal measuring operation is necessary. Specifically, in a preferred embodiment of the invention, the duration of the interruption of the normal measuring operation is controlled within a range from 10 to 200 msec. Also, in a preferred variation of the invention, the intervals between two interruptions of the normal measuring operation are controlled within a range from 1 to 100 sec During the interruption of the normal measuring operation, the output of measured values may be deactivated. In a preferred embodiment of the invention, however, the system permits the output, during an interruption of the normal measuring operation, of the measured value last acquired. As an alternative, in another preferred variation of the invention, it is possible during the interruption of the normal measuring operation for an auxiliary measuring operation to take place for the acquisition and output of a less precise measured value.

As an example for such an auxiliary measuring operation, less power may be available for the actual measuring operation, thus yielding a weaker signal with a correspondingly degraded signal-to-noise ratio. Then, too, the measured value acquired during the auxiliary measuring operation may be affected by the parallel diagnostic function that takes place at the same time.

In this connection, a preferred embodiment of the invention provides for the activation of an auxiliary measuring operation during an interruption of the normal measuring operation to be controlled according to the type of diagnostic function to be performed. This variation of the method takes into account that, due to their interaction with components of the measuring instrument, some diagnostic functions do not permit any measuring operation, including any auxiliary measuring operation. But for diagnostic functions that do permit some form of concurrent measuring operation, the total absence of any backup measuring operation during the interruptions of the normal measuring operation can be avoided by the selective activation of an auxiliary measuring operation.

The results of the individual diagnostic functions, i.e. the values determined by them, may be read out as they are obtained. In a preferred variation of the invention, however, the results of the individual diagnostic functions are averaged over time. Thus, only short interruptions of the normal measuring operation are needed while the diagnostic values determined are more accurate. In this context, diagnostic functions that require multiple averaging may be repeated more often than others.

Finally, in a preferred embodiment of the invention, the entire process control sequence is repeated periodically. It is also possible to deactivate the process control as a whole, meaning all diagnostic functions, or to deactivate only specific individual diagnostic functions. This can be accomplished by the user, typically on the measuring instrument itself, or electronically by a control system via a control input.

One preferred version of the invention provides for the specific use of the method described above in magnetoinductive flowmeters. Magnetoinductive flowmeters have been well established in prior art. They typically incorporate a measuring tube through which flows a fluid medium, two measuring electrodes positioned along a connecting line that extends in an essentially perpendicular direction relative to the axis of the measuring tube, and two field coils that generate a magnetic field that extends in a direction essentially perpendicular to the axis of the measuring tube and perpendicular to the connecting line between the measuring electrodes. The flow rate of the fluid medium through the measuring tube is determined by collecting a voltage at one or both of the measuring electrodes and relating it to a reference potential.

The principle of magnetoinductive flow measurements is based on electrodynamic induction: Faraday's law of induction holds that in a flowing medium containing charge carriers and traveling through a magnetic field, an electric field intensity is generated in a direction perpendicular to the flow vector and to the magnetic field. Within the magnetic field, each volume element of the flowing medium moving through the magnetic field and containing a certain number of charge carriers contributes the field intensity generated in that volume element to a measuring voltage that can be collected via the measuring electrodes.

Typically, in the routine flow-measuring operation of a magnetoinductive flowmeter, the magnetic field is periodically polarity-reversed. That has been accomplished employing different approaches, one being the use of an alternating field or a switched constant field. Also possible is the use of a pulsating constant field which is maintained in that the field coils of the magnet are intermittently fed a constant-polarity square-wave current. A preferred method, however, involves the periodic polarity reversal of the field current since such polarity changes of the magnetic field help to suppress interference variables such as electrochemical noise.

Magnetoinductive flowmeters are susceptible to numerous types of interference factors that can negatively affect a dependable measuring operation. To mention only one example, substances precipitating from the flowing medium onto the electrodes that are in electrically conductive contact with the medium can lead to fouled electrodes, thus compromising the accuracy of the measured results.

In a magnetoinductive flowmeter of this type, the diagnostic functions referred to above, if subjected to a process control according to this invention, may include, for example, the following: an electrode impedance measurement by applying a test current on the electrodes of the magnetoinductive flowmeter, a linearity test by a specific change of the field current, the addition of a known test signal to the regular electrode signal for monitoring the preamplification and/or A/D conversion, and the generation of a heterogeneous magnetic field. It should be noted that a heterogeneous magnetic field can be generated, for instance, by means of mutually opposite field coils through which flows current in opposing directions.

When in a preferred embodiment the process control according to this invention is used in a magnetoinductive flowmeter, the specific timing can be set in a manner where the interval between two interruptions of the normal measuring operation of the magnetoinductive flowmeter is so controlled that said interval corresponds to a multiple value of the half cycle of the magnetic field.

There are numerous ways in which the method according to this invention can be configured and implemented. In that context, attention is invited to the dependent claims as well as to the following description of a preferred embodiment of the invention.

DESCRIPTION OF ILLUSTRATIVE EMBODIMENTS

Figure 1:
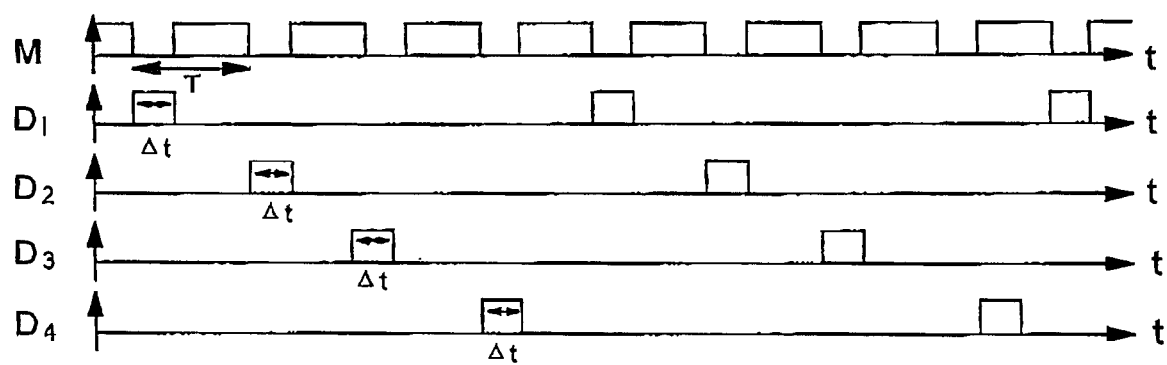
FIG. 1 is a schematic representation of the process control feature in a preferred embodiment of the invention.

FIG. 1 is a schematic illustration of the control of the normal measuring operation M as well as the control of four different diagnostic functions $D_1$, $D_2$, $D_3$ and $D_4$. The normal measuring operation is interrupted at uniform intervals and the individual diagnostic functions are sequentially performed during these interruptions of the normal measuring operation. In the example shown, all of the diagnostic functions are repeated at the same frequency and each interruption of the normal measuring operation accommodating the individual diagnostic functions is of equal length. As has been explained further above, however, this is not imperative and both the repeat frequencies of the individual diagnostic functions and the respective duration times of the interruptions in the normal measuring operation for accommodating the individual diagnostic functions may vary according to specific requirements.

The periodic interruption of the normal measuring operation corresponds to the periodic repetition i.e. resumption of the normal measuring operation at a predefined frequency $f$. That frequency $f$ is matched by the cycle duration or period $T=1/f$, which period T is substantially longer in the case of this example than the respective duration $\Delta t$ of the interruption of the measuring operation for performing a diagnostic function. Specifically, in the preferred embodiment of the invention here described, the period T for the normal measuring operation is between 1 and 200 sec while the duration $\Delta t$ of the interruption of the normal measuring operation accommodating the execution of a diagnostic function is merely 10 to 200 msec. It follows that the conditions illustrated in FIG. 1 do not represent the timing conditions actually selected.

Figure 2:
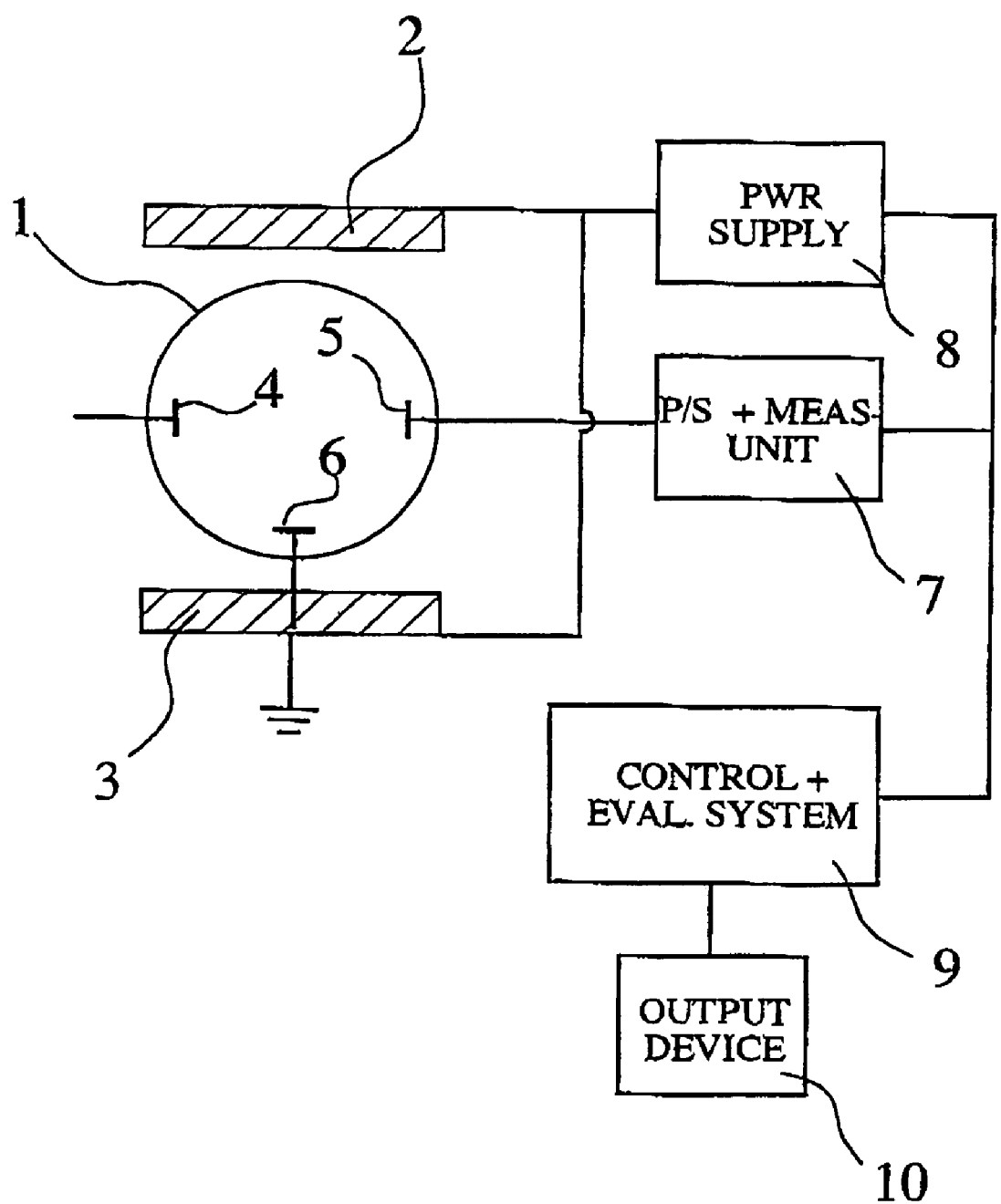
FIG. 2 is a schematic representation of a magnetoinductive flowmeter that is operated under process control according to a preferred embodiment of the invention.

FIG. 2 is a schematic illustration of a magnetoinductive flowmeter operating under process control according to a preferred embodiment of the invention. The magnetoinductive flowmeter comprises a measuring tube 1 through which flows the electrically conductive medium, not illustrated. Two field coils 2, 3 generate a magnetic field that extends in a direction essentially perpendicular to the flow direction of the medium through tube 1. Two measuring electrodes 4, 5, so positioned that their connecting line extends in a direction essentially perpendicular to the flow direction and to the magnetic field orientation, serve to collect the induced voltage. Also provided is a grounded reference electrode 6.

In the case of the magnetoinductive flowmeter illustrated in FIG. 2, two diagnostic functions have been implemented, these being the feeding of a test current to the electrodes 4, 5 and a linearity check through the selective change of the field current flowing through the field coils 2, 3. To that end, a power-supply and measuring unit 7 permits feeding the measuring electrodes 4, 5 with an alternating current in comparison with a reference potential as well as measuring the impedance of the measuring electrodes 4, 5 to which the alternating current was supplied. For simplicity's sake, this is shown for the right-hand measuring electrode 5 only.

In addition, there is a field-coil power supply 8 that feeds a predefined field current to the field coils 2, 3. Increasing the field current by a preselected factor also augments the magnetic field by that same factor which, in turn, can be expected to increase the induced voltage by a corresponding factor. In this fashion it is possible, with the aid of the field-coil power supply 8 and the voltage induced via the power-supply and measuring unit 7, to perform a linearity check of the magnetoinductive flowmeter. In connection with the use of a test current on the electrodes 4, 5 of the magnetoinductive flowmeter and with the linearity test through the selective change of the field current of the field coils 2, 3, explicit reference is made to the prior art, specifically DE 101 18 002 A1 and DE 100 64 738 A1.

The two diagnostic functions—test current and linearity check, respectively, are performed at the times during which the normal measuring operation of the magnetoinductive flowmeter is interrupted. In the example described, the normal measuring operation of the magnetoinductive flowmeter is interrupted at intervals that correspond to a multiple of the half-cycle of the magnetic field. In this case, the test current is applied and the linearity check performed in alternating fashion. The duration of each interruption essentially corresponds to the length of time needed for carrying out the respective diagnostic function, meaning that the diagnostic function is activated the moment the normal measuring operation is interrupted, and normal measuring operation is resumed immediately upon completion of the diagnostic function.

In the preferred embodiment of the invention shown in FIG. 2, the process control is assumed by a process-control and evaluation system 9. That system also receives the results of the diagnostic functions, enabling it to perform the time-based averaging of these results before their output to an output device 10 such as a display or bus interface. The diagnostic functions are thus integrated in simple and efficient fashion into the operation of the magnetoinductive flowmeter without significantly affecting its normal measuring operation.

What is claimed is:

1. A method for operating a measuring instrument, which measuring instrument is capable of multiple diagnostic functions, wherein for carrying out these diagnostic functions, a process control is applied in such fashion that a normal measuring operation of the measuring instrument is interrupted, that during the interruption of the normal measuring operation a first diagnostic function is performed, that upon completion of said first diagnostic function the normal measuring operation is resumed, that the normal measuring operation is then interrupted again, and that during such interruption of the normal measuring operation a second diagnostic function is performed and an auxiliary measuring operation takes place which acquires and outputs a less precise measured value.

2. The method as in claim 1, wherein upon completion of the second diagnostic function, the normal measuring operation is resumed, the normal measuring operation is then interrupted again, and during such interruption of the normal measuring operation, the first diagnostic function or a third diagnostic function is performed.

3. The method as in claim 1 or 2, wherein the individual diagnostic functions are periodically repeated at various frequencies.

4. The method as in claim 1 or 2, wherein in each case the duration of the interruption of the normal measuring operation is controlled according to the type of diagnostic function being performed.

5. The method as in claim 1 or 2, wherein the measured value output during an interruption of the normal measuring operation is the measured value last acquired.

6. The method as in claim 1 or 2 wherein the auxiliary measuring operation is controlled according to the type of diagnostic function being performed.

7. The method as in claim 1 or 2 wherein the results of the individual diagnostic functions are averaged over time.

8. The method as in claim 1 or 2 wherein the entire process control sequence is periodically repeated.

9. The method according to claim 1 or 2 wherein the measuring instrument is a magnetoinductive flowmeter.

10. The method as in claim 9, wherein the diagnostic functions are selected from among a group including an electrode impedance measurement in which a test current is applied to the electrodes of the magnetoinductive flowmeter, a linearity check via the selective change of the field current, the addition of a known test signal to the normal electrode signal for monitoring the preamplification and/or A/D conversion, and the generation of a heterogeneous magnetic field.

11. The method as in claim 10, wherein the time interval between two interruptions of the normal measuring operation of the magnetoinductive flowmeter is controlled in such fashion that said time interval corresponds to a multiple of the half-period of the magnetic field.

12. A measuring instrument, in particular a magnetoinductive flowmeter, with a process control system for implementing the method according to claim 1 or 2.

* * * * *